United States Patent [19]
Johnson

[11] 3,879,854
[45] Apr. 29, 1975

[54] SCREW THREAD COMPARATOR GAGING DEVICE HAVING TI-POINT AND SEGMENTAL GAGING MEANS USING A SINGLE INDICATOR

[75] Inventor: Stanley G. Johnson, West Hartford, Conn.

[73] Assignee: The Johnson Gage Company, Bloomfield, Conn.

[22] Filed: July 1, 1974

[21] Appl. No.: 484,557

[52] U.S. Cl. ............................................. 33/199 R
[51] Int. Cl. ............................................. G01b 3/14
[58] Field of Search ....................... 33/199 R, 199 B

[56] References Cited
UNITED STATES PATENTS

| | | | |
|---|---|---|---|
| 2,586,053 | 2/1952 | Johnson | 33/199 R |
| 3,358,376 | 12/1967 | Johnson | 33/199 R |

*Primary Examiner*—Harry N. Haroian
*Attorney, Agent, or Firm*—John M. Montstream

[57] ABSTRACT

A dual comparator for screw threads is disclosed having a pitch diameter or tri-point gage, shown as three angularly spaced gaging rolls or elements and a functional gage having two segmental members preferably pivotally mounted. The two gages are mounted on a frame with fixed and spaced arms. One of the gaging elements of the tri-point or tri-roll gage and one of the segmental gaging members is movable towards and away from its cooperating gaging means or radially with respect to the test part in the gaging means. The movement of the tri-point gaging element with a test part in the gage does not give a true reading of the deviation of the test part from a perfect thread. The segmental gaging members of the functional gage engages the test thread across the diameter thereof so that the movement or position of the movable gaging member gives a true or direct reading on the indicator of the deviation of the test part from a perfect thread. The cost of this dual gage is materially reduced if a single indicator can be used for both gages. Lever means connects the radially movable gaging element and the radially movable segmental member to a single indicator such that the two gages give a true indication or reading on the indicator of any deviation in the test thread from a perfect thread. The lever means may be a single lever or a pair of levers.

16 Claims, 5 Drawing Figures

SCREW THREAD COMPARATOR GAGING DEVICE HAVING TI-POINT AND SEGMENTAL GAGING MEANS USING A SINGLE INDICATOR

The two basic tests in gaging an external screw thread in order to determine its acceptability are a pitch diameter test and functional test. The pitch diameter test is made with a gage which has three angularly spaced gaging contacts, such as rolls to form a tri-roll gage, so as to engage the test part at equal angularly spaced points on the periphery of the test thread. The contacts or rolls usually have one or two annular gaging ridges which engage the test thread at or about at the pitch diameter of the test thread. The functional test is made with a gage having gaging members which engage the test thread across a diameter thereof and has a plurality of gaging ridges or a portion of an internal screw thread on its gaging surface corresponding with the test thread.

Because of the construction of the pitch diameter gage, the movement or position of its movable gaging element is not a true reading of the deviation of a test thread from a perfect or master thread hence when a separate indicator is used it is positioned such that it gives a reading which is two thirds of the actual movement of the gaging element which then is a direct or true reading of the deviation of the test part from a perfect thread.

A screw thread comparator having dual gaging means is simplified and less costly if the two gages can use a single indicator for both gages. A dual comparator which accomplishes this is described in my U.S. Pat. No. 3,353,277 which uses a main frame having a fixed arm and a pivoted arm to carry the movable gaging element of both gages with the pitch diameter gage and the functional gage being located on the arms in a ratio of or about 3:2 from the arm pivot.

The dual comparator herein secures a direct reading of both gages with a single indicator with a frame having fixed arms, a mounting for one gaging element of each gage which allows radial movement of the gaging element with respect to the test part or movement towards and away from its cooperating gaging element or member and a lever means which translates the movement or position of each movable gaging element into a direct reading on the single indicator.

The principal object of the invention is to construct a new form of dual comparator for gaging screw threads having a pitch diameter gage engaging the test part at three spaced points around the periphery of the test thread and a functional gage engaging the test part across the diameter and each gage making use of a single indicator which gives a direct or true reading for each gage of any deviation of the test thread from that of a perfect or master thread.

More particularly, it is an object to construct a dual comparator as above using a main frame with fixed or integral arms and with one of the gaging elements or members of each gage being mounted for movement radially of the test part or towards and away from its cooperating element or member and to translate the position or movement of each gaging element or member by lever means so as to give a direct reading of any deviation in the test part from a perfect thread on a single indicator.

Another object is to construct a dual comparator as above with a lever means utulizing a pair of levers.

A further object is to construct a dual comparator as described in which the lever means is a single lever.

Other objects of the invention will be more apparent from the following description when taken in connection with the accompanying drawings illustrating preferred embodiments of the invention in which.

Figure 1:
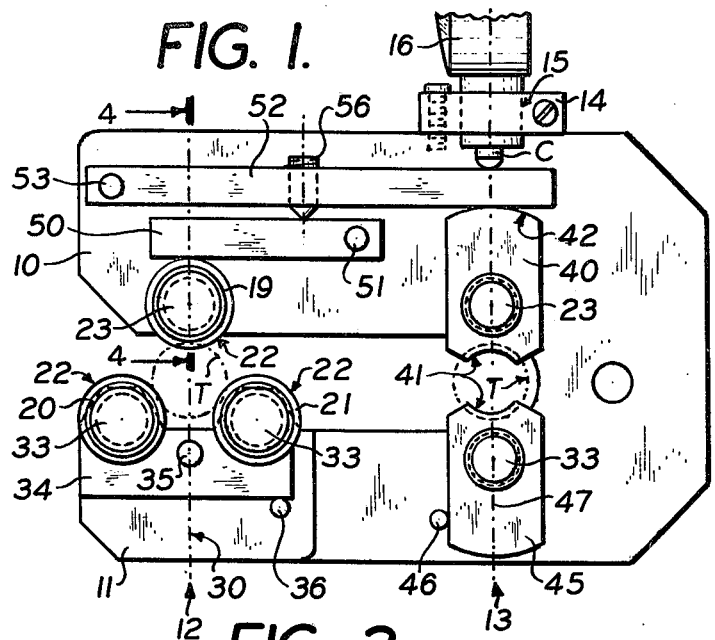
FIG. 1 is a side view of a dual comparator with one form of lever means.

The comparator includes a main frame comprising a first arm 10 and a second arm 11 which are fixed to each other or integral. The pitch diameter gage 12 and the functional gage 13 are mounted on this frame and are suitably spaced from each other for independent operation. The frame carries indicator mounting means including a bracket 14 having a hole 15 there through for receiving the stem of an indicator 16.

The pitch diameter gage includes three gaging elements, preferably gaging rolls 19, 20 and 21 each having an annular gaging ridge 22 or ridges in known manner on the periphery therof. The gaging element or roll 19 is suitably mounted on the first arm 10 of the main frame for movement radially with respect to the test thread T or towards and away from its cooperating gaging means. The mounting means may be any suitable construction that shown is a stud 23 secured to the frame. The stud described and claimed in my patent application Ser. No. 409,089 is a suitable mounting means for the gaging roll on which the roll is rotatable as well as movable radially towards and away from its cooperating gaging means. Briefly this stud has a core 24 secured to the arm 10 by a screw 25. An outer sleeve 26 having a bore 27 larger than the core, has pin means 28, shown as one pin, secured thereto, and slidable in a hole 29 in the core. The pin means is positioned such that its axis is in alignment with the gage axis 30. A screw 31 retains the roll 19 on the stud.

The cooperating gaging means for the pitch diameter gage 12 comprises the two spaced gaging elements or rolls 20 and 21. Each of the two gaging rolls is mounted on a sutiable stud 38 so that the roll may rotate but has no radial movement. The two rolls, preferably are mounted on a pivoted frame 34 having a pivot 35 carried by the second arm 11 of the main frame whereby the pivoted frame and its roll may be pivoted to open position. The test thread is placed on the two rolls or gaging elements and then it and this frame is pivoted to a stop 36 which locates the cooperating gaging means in gaging position with respect to its gaging element 19. This position is illustrated The gaging elements or rolls may be fixed to the second arm in which event the test part would be threaded into the gage. The pivoted frame provides a quick way to axially insert the test part into and remove the same from the gage.

The functional gage 13 includes a segmental gaging member 40 which has a concave gaging surface 41 bearing a portion of an internal screw thread corresponding with the thread of the test part T. This gaging member is mounted on the main frame on suitable mounting means so that it has radial movement, with respect to the test part or, towards and away from its cooperating gaging means. Preferably the gaging member is mounted for pivotal movement as well so that the same form of stud 23 as that mounting the gaging roll 19 is used with its pin means 28 in alignment with the gaging axis 47. This gaging member has a rounded surface 42 shown as the end of the segment.

The cooperating gaging means for the functional gage 13 is a segmental member 45 like the segmental member 40 with a corresponding concave gaging surface 41 having a portion of an internal screw thread thereon corresponding with the test thread. Mounting means mounts this segmental member on the second arm 11 of the main frame in cooperative gaging relation with the first member 40. The mounting means preferably mounts the member for pivotal movement on a stud 33 which is otherwise fixed with respect to the segmental member 45 and has a stop 46 to limit pivotal movement to gaging position when the concave surfaces of both segmental members are on the gaging axis 47 pivotally mounted segments enable them to pivot to and from open position for quick axial insertion and removal of the test part from the gage. The two segmental members may, if desired, be fixed in gaging position in which event the test thread is threaded into the gage for testing.

A dual comparator is less expensive to manufacture if both gages can use one indicator. This is accomplished with interconnecting lever means comprising at least one lever connecting the movable gaging element 19 of the pitch diameter gage and the movable segmental gaging member 40 of the functional gage at the indicator axis 47 or with the contactor C of the indicator 16. There are three forms of lever means particulary illustrated on one of which forms is illustrated in two different lever ratios and others are available.

The lever means of FIG. 1 includes two levers. The first lever 50 is pivotally mounted on the main frame on a pivot 51 spaced from the roll 19 and lying generally between the two gages. This lever rests on a suitable part of the roll 19 such as the gaging ridge 22 thereof. A second lever 52 is pivotally mounted on the main frame on a pivot 53 which lever perferably lies just above the first lever and extends to and beyond the gaging or indicator axis 47, so that the contactor C of the indicator 16 therein engages the same. This second lever is engaged by the surface 42 of the segmental gaging member 40 when in gaging position.

The indicator contactor C engages the lever 52 at a point which is in alignment with the gaging axis 47 for the segments of the functional gage or the indicator axis, which axis extends between the centers of the studs 23, 33 thereof. This location gives a direct or true reading of the position or movement of the movable segmental member 40 of this gage and a direct reading of any deviation of the test thread within this gage from a perfect thread.

An interconnection is provided between the two levers 50 and 52 such that the position or movement of the movable gaging element or roll 19 of the tri-roll or tripoint pitch diameter gage 12 with a test part in the gage will give a direct reading on the indicator of any deviation of the test thread from a master or perfect thread. The interconnection is located between the gages so that short levers can be used. The interconnection shown is a pointed screw 56 carried by one lever and engaging the other lever and is conveniently carried by the second lever 52. The location of this screw is such that the lever ratios will give a direct reading on the indicator for the pitch diameter gage 12. A convenient location is the point where ½ of a direct reading would be secured. A direct reading of the deviation of a test part in gaging position would be a point ⅔ of the dimension between the pivot 51 and the point of contact of the roll 19 with the lever. A half of the direct reading would then be at ⅓ of the dimension between the lever pivot 51 and the point of contact of the lever with the roll 19. With this location for the inter connection or screw 56, the lever ratio for the lever 52 must be 2 to 1, that is the dimension between the pivot for the lever 52 and the gaging or indicator axis 47 is 2 and the dimension between the pivot 53 and the screw 56 is 1. This ratio is the inverse of the direct reading ratio of 1 to 2 for the first lever 50.

Figure 2:
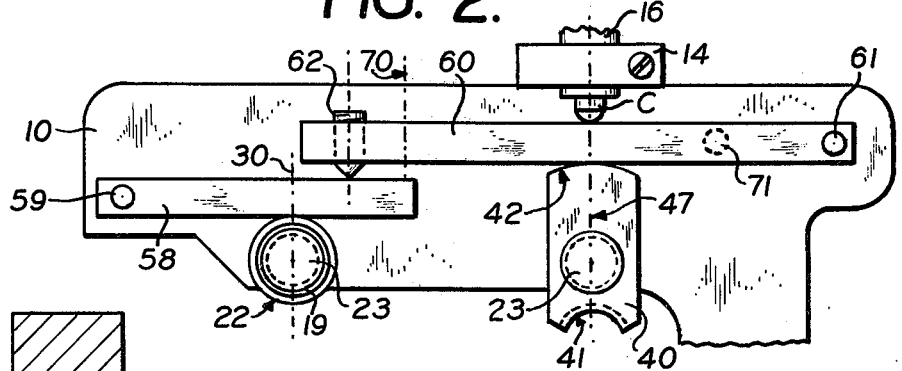
FIG. 2 is a partial side view of a comparator showing a different form of lever means.
Figure 4:
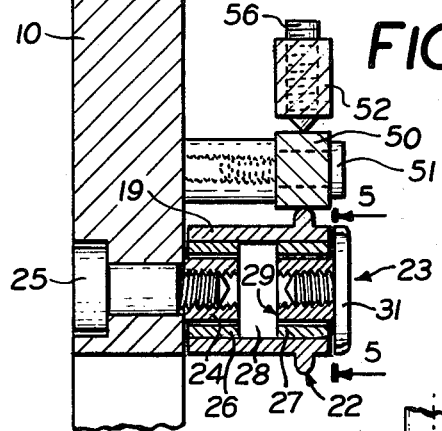
FIG. 4 is an enlarged sectional view of the stud for mounting the movable gaging element and movable gaging member taken on line 4—4 of FIG. 1.
Figure 5:
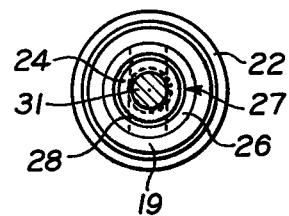
FIG. 5 is an end view of the stud as viewed on line 5—5 of FIG. 4.

FIG. 2 shows another form of lever means for securing a direct reading of a test thread deviation for a dual gage comparator using a single indicator. This lever means uses two levers including a first lever 58 pivotally mounted on the first arm of the main frame on a pivot 59 located forwardly of the gages. This lever engages the moveable gaging roll 19 and shown as engaging the annular ridge thereof. A second lever 60 is preferably located above the first lever and is mounted on the main frame on a pivot 61 rearwardly of the gages. An interconnection between the levers is located between the gages so that short levers can be used. The interconnection is a screw 62, shown as carried by the lever 60. This screw engages the first lever at a point which is 4/3 of the dimension between the pivot 59 and the point of contact of the lever with the movable gaging roll or element 19 or the gaging axis 30 for the pitch diameter gage. At the point of contact of the screw with the lever, the movement of the lever is twice that of a direct reading. The lever ratio for the lever 60 and the location of the interconnection or screw 62 is such that a direct reading is obtained of any deviation of a test thread T from a perfect thread. To secure this the screw 62 is located on the lever 60 at a point such that the lever ratio from the pivot 61 to the interconnection is 2 and the lever ratio from the pivot 61 to the indicator or gaging axis 47 is 1 whereby the movement of the contactor C is ½ the movement of the interconnection 62 or the inverse ratio of the direct reading ratio of 2 to 1 for the first lever. The indicator and its axis are in alignment with the gaging axis 47 of the segmental or functional gage 13.

Figure 3:
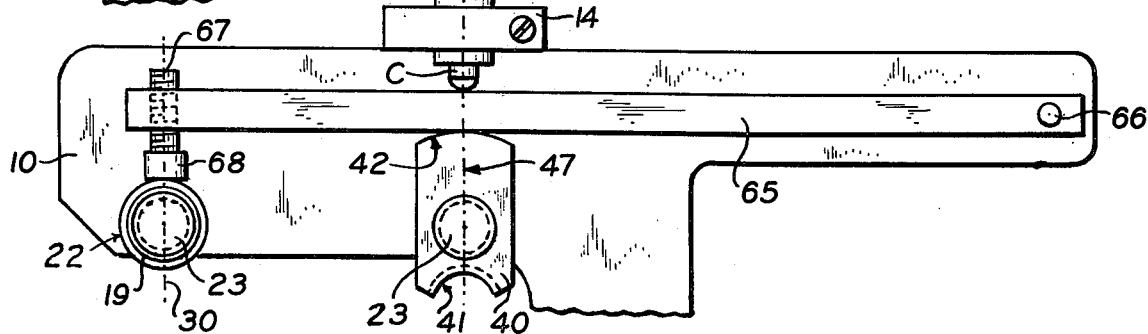
FIG. 3 is a partial side view of a comparator with the lever means being a single lever.

A dual comparator is illustrated in FIG. 3 using a single indicator for both gages and a single lever 65 as the lever means. This lever has a pivot 66 carried by the main frame rearwardly of the gages. This lever is engaged by the end surface 42 of the segmental member 40 at a point in alignment with the indicator or gaging axis 47. This lever carries an interconnection from the roll 19 of the pitch diameter gage to the lever in a screw 67 shown as engaging the ridge 22. This screw may have a head 68 which is the engaging part. The length of the lever and location of the pivot 66 is such that the dimension from the pivot 66 to the axis 47 of the segmental gage or indicator is 2 and the dimension from the pivot 66 to the interconnection or screw 67 is 3 for a direct reading ratio of ⅔ for the pitch diameter gage 12. With this ratio in the lever means any deviation of a test thread from a perfect thread is a direct or true reading for the functional or segmental gage 13 as well as for the pitch diameter gage 12.

There are variations in the ratios of the lever means which may be used, for example, in FIG. 1 the interconnection or screw 56 may be located to engage the first lever 52 at its center between the pivot 51 and the roll 19 which would be ¾ of a direct reading in which event the ratio of leverage for the second lever 52 would be 4 to 3 which is the inverse of the direct reading ratio. This ratio requires that dimension from pivot 53 to the indicator axis 47 be 4 and the dimension from pivot 53 to the indicator axis 47 be 4 and the dimension from the pivot 53 to the screw 56 be 3. The dimension from the screw 56 to the indicator axis is 1 or unity. For this location of the interconnection and ratios for the lever means would result in the second lever being relatively long. Other locations for the interconnection can be determined.

Similarly there are variations which can be made with respect to the lever means of FIG. 2 and the location of the interconnection between levers. In the construction of FIG. 2, the location of the interconnection or screw 62 is such that the movement at the interconnection is greater than the direct reading that is an amplification. For example, placing the interconnecting screw 62 at the line 70 which is 5/3 of the dimension between the pivot 59 and the point of contact of the lever with the roll 19 or the gaging axis 30. At this 5/3 point, the movement of the lever is 5/2 or 2 ½ times the direct reading so that the lever ratio for the second lever 60 would be the inverse or 2 to 5, that is the pivot 61 would be located at point 71 where the dimension from pivot 71 to the indicator axis 47 is 2 and the dimension from the pivot point 71 to the interconnection point 70 is 5. The first lever 58 could be shortened but with the same ratio, which however would lengthen the second lever.

The distance between the gages is a factor in determining the length of the second lever. Spacing the gages farther apart would lengthen the second levers of FIGS. 1 and 2 and lengthen the lever of FIG. 3. Bringing the gages closer together would shorten these levers, however, the spacing shown provides sufficient spacing between gages so that there will be no interference in the axial insertion and removal of a test thread from the functional gage 13.

It will be noted that the second lever rests on the first lever so that it serves as a stop therefor. The spring in the indicator pressing the contactor C downwardly normally provides sufficient pressure to bring the lever or levers into contact with the gaging roll 19 and the segmental member 40 and to press the gaging roll and the segmental member into contact with the test part within its respective gage. If greater spring pressure should be deemed desirable it can be increased by adding a spring to the indicator. The gaging axis 47 for the functional gage is the same as the indicator axis. Each stud 23 or mounting means provides sufficient movement along its respective gaging axis in excess of the tolerance limits of the test thread and also so that there will be no interference from the first lever when gaging with the segmental gage. Also the interconnection preferably is one which is separable so that the second lever is operable independently of the first lever and the single lever 65 is operable by the movable segmental member without interference from the gaging roll 19.

This invention is presented to fill a need for improvements in a dual comparator using a single indicator. Various modifications may and often do occur to those skilled in the art, especially after benefiting from the teachings herein. This disclosure illustrates some preferred means of embodying the invention in useful form.

What is claimed is:

1. A dual comparator for gaging screw threads and adapted to use an indicator comprising a main frame having a first arm and a second arm spaced from the first arm and fixed thereto; a pitch diameter gage including a single gaging element means mounting the single gaging element, on the first arm of the main frame, cooperating gaging means, including a pair of gaging elements spaced from each other, means mounting the cooperating gaging means in cooperative alignment with and spaced from the single gaging element, the three gaging elements being positioned to engage a test thread at three spaced points on the periphery thereof, and means mounting the single gaging element for movement with respect to the first arm towards and away from its cooperating gaging means; a functional gage including a first segmental gaging member, a cooperating segmental gaging member, means mounting the cooperating segmental gaging member on the second arm of the main frame in cooperative alignment with the first segmental gaging member, each segmental gaging member having a concave gaging surface having a portion of a screw thread therein, the first segmental gaging member having an end, the segmental gaging members having a gaging axis through the concave gaging surfaces in gaging position, and means mounting the first segmental gaging member for movement with respect to the first arm towards and away from its cooperating gaging member; indicator mounting means carried by the first arm of the main frame for mounting a single indicator on an indicator axis in alignment with the gaging axis of the segmental gaging members; and lever means including at least one lever, pivot means pivotally mounting the lever means on the main frame, the lever means being operatively located to be engaged by the first segmental gaging member when in gaging position, and the lever means being operatively connected with the movable gaging element of the pitch diameter gage with a lever ratio such that ⅔ of the movement of the movable gaging element is transmitted to the indicator axis for operation of an indicator.

2. A dual comparator as in claim 1 in which the gaging elements of the pitch diameter gage are rolls, and the mounting means for each roll is a stud which mounts the roll for rotation.

3. A dual comparator as in claim 2 including a pivoted frame carrying the rolls for the cooperating gaging means for axial insertion and removal of the test thread from the gage, and stop means carried by the main frame to limit pivoting of the cooperative gaging means to gaging position.

4. A dual comparator as in claim 2 in which the mounting means for each of the segmental gaging is a stud pivotally mounting mounting the same for axial insertion and removal of the test thread from the gage, and stop means carried by the main frame limiting pivotal movement of one of the members to gaging position.

5. A dual comparator as in claim 4 including a pivotal frame mounting the cooperating gaging means of the pitch diameter gage for axial insertion and removal of a test thread from the gage, and stop means carried by the main frame to limit the pivoting of the cooperating gaging means to gaging position.

6. A dual comparator as in claim 1 in which the lever means includes a first lever, a pivot on the main frame mounting the first lever, a second lever, a pivot on the main frame mounting the secondlever, and interconnection between the levers located between the gages such that ⅔ of the movement of the movable gaging element is transmitted to the second lever at the indicator axis.

7. A dual comparator as in claim 6 in which the interconnection between the first and second levers is at a point less than ⅔ of the dimension between the pivot for the first lever and the point of contact of the first lever with the movable gaging element, and the lever ratio of the dimension between the pivot and the second lever and the interconnection with respect to the dimension between the pivot of the second lever to the indicator axis is the inverse of the direct reading ratio of the first lever and a ratio greater than one.

8. A dual comparator as in claim 7 in which the interconnection between the levers is at a point on the first lever ⅓ of the dimension between its pivot and the point of contact of the movable gaging element of the pitch diameter gage, and at a point on the second lever such that the dimension from the pivot to the indicator axis is 2 and the dimension from its pivot to the interconnection is 1.

9. A dual comparator as in claim 6 in which the interconnection between the first and second levers is at a point on the first lever greater than ⅔ of the dimension between the pivot and the point of contact of the lever with the movable gaging element, and the lever ratio of the dimension between the pivot of the second lever and the interconnection with respect to the dimension between the pivot of the second lever to the indicator axis is the inverse of the direct reading ratio of the first lever.

10. A dual comparator as in claim 9 in which the inerconnection between the first and second levers is at a point on the first lever of 4/3 of the dimension between the pivot and point of contact of the movable gaging element therewith, and the point of interconnection with the second lever provides a 1 to 2 ratio between the dimension from its pivot to the indicator axis and the dimension from the pivot to the interconnection.

11. A dual comparator as in claim 9 in which the interconnection between the first and second levers is at a point on the first lever of 5/3 of the dimension between the pivot and the point of contact of the movable gaging element therewith, and the point of interconnection with the second lever provides a 2 to 5 ratio between the dimension from the pivot to the interconnection.

12. A dual comparator as in claim 1 in which the lever means is a single lever, a pivot mounting the lever on the main frame, the dimension from the pivot to the indicator axis and the dimension from the pivot to the point of contact with the movable gaging element of the pitch diameter gage being in the ratio of 2 to 3.

13. A dual comparator as in claim 5 in which the lever means includes a first lever, a pivot on the main frame pivotally mounting the first lever, a second lever, a pivot on the main frame pivotally mounting the second lever, an interconnection between the levers located between the gages, said interconnected being at a point from the pivot on the first lever which is ⅓ of the dimension between its pivot and the point of contact with the movable gaging roll of the pitch diameter gage and at a point on the second lever such that the dimension from its pivot to the indicator axis is 2 and the dimension from its pivot to the interconnection is 1.

14. A dual comparator as in claim 5 in which the lever means includes a first lever, a pivot on the main frame pivotally mounting the first lever, a second lever, a pivot on the main frame pivotally mounting the second lever, an interconnection between the levers, said interconnection being at a point on the first lever which is 4/3 of the dimension from its pivot to the point of contact of the lever with the movable gaging roll of the pitch diameter gage and at a point on the second lever such that the second lever provides a 1 to 2 ratio between the dimension from its pivot to the indicator axis and the dimension from its pivot to the interconnection.

15. A dual comparator as in claim 5 in which the lever means includes a first lever, a pivot on the main frame pivotally mounting the first lever, a second lever, a pivot on the main frame pivotally mounting the second lever, an interconnection between the levers located between the gages, the interconnection as to the first lever being at a point which is 5/3 of the dimension between the pivot and the point of contact of the gaging roll therewith, and the point of interconnection as to the second lever provides a 2 to 5 ratio between the dimension from the pivot to the indicator axis and dimension from the pivot to the interconnection.

16. A dual comparator as in claim 5 in which the lever means is a single lever, a pivot on the main frame pivotally mounting the lever, the dimension from the pivot to the indicator axis and the dimension from the pivot to the point of contact with the movable gaging roll of the pitch diameter gage being in the ratio of 2 to 3.

* * * * *